Patented Dec. 30, 1947

2,433,525

UNITED STATES PATENT OFFICE 2,433,525

BISDIBUTYLAMINOALKANES AS INSECTICIDES

Glen H. Morey, Terre Haute, Ind., assignor to Commercial Solvents Corporation, Terre Haute, Ind., a corporation of Maryland No Drawing. Application April 5, 1944, Serial No. 529,666

7 Claims. (Cl. 167—22)

My invention relates to insecticidal compositions and is particularly concerned with spray materials adapted for combating flies, mosquitoes, and common agricultural insect pests. More particularly, it relates to the use of certain bisdibutylaminoalkanes as active contact insecticidal agents in the aforesaid compositions.

Extracts of materials, such as pyrethrum flowers, derris, cube, timbo, barbasco, and the like, have previously been widely used for the control of various insect pests. These toxicants are generally used as constituents of dusting mixtures, petroleum distillate sprays, or in the form of aqueous suspensions. Pyrethrum-containing compositions have a rapid paralyzing action on flies and other insects, but give a relatively low kill as compared to the per cent knockdown. With rotenone, a high kill is generally obtained although a considerable period of time is required to destroy the insects. The plant extracts are generally unstable and lose their activity to a considerable degree upon standing for a period of time. Also, there has been a number of synthetic preparations proposed for use as contact insecticides; however, the majority of such compounds which possess the greatest effectiveness have a highly objectionable odor, and hence, are not entirely satisfactory for household or other uses.

I have now discovered a group of compounds capable of functioning as contact insecticides, some of which give an average kill of 95 per cent and above and which are free from the foregoing objectionable characteristics. Specifically, these compounds are bisdibutylaminoalkanes in which the alkylene group, both ends of which are singly bonded to a separate nitrogen atom, contains from three to four carbon atoms. Examples of such compounds are 1,4-bisdibutylaminobutane, 1,3-bisdibutylaminopropane, 1,2-bisdibutylaminobutane.

Compounds of the type listed above are readily prepared by catalytically hydrogenating in the liquid phase the corresponding bisdibutylaminoalkanes. The procedure involved entails subjecting the desired bisdibutylaminoalkanes to the action of molecular hydrogen under pressures of approximately 800 to 1000 pounds and above, in the presence of a suitable catalyst, such as for example Raney nickel, and a solvent which may be any of several materials, such as for example methanol, a suitable aliphatic amine, or the equivalent thereof. The bisdibutylaminoalkanes themselves can be readily prepared by reacting a suitable dihaloalkene with a secondary aliphatic amine. In effecting this reaction, I prefer to employ approximately 6 moles of secondary amine for each mole of dihaloalkene used. By employing such proportions, there is sufficient excess of secondary amine present to serve as a solvent for the reaction, and also, as a solvent for the subsequent hydrogenation step. The reaction is preferably initiated at room temperature. However, the heat generated thereby ordinarily elevates the reaction temperature to between 70 and 80° C. When the reaction appears to be complete, an aqueous solution of sodium hydroxide is added to the mixture in order to liberate the secondary amines from the hydrogen halide with which it has combined during the course of the reaction. As a result of the addition of the aforesaid aqueous sodium hydroxide solution, two liquid layers are formed, the lower layer consisting chiefly of water and sodium chloride, and the upper layer consisting principally of the desired bisdibutylaminoalkane together with the excess secondary amine. The two layers are separated, and the upper layer containing the crude bisdibutylaminoalkane and excess secondary amine may then be subjected to reduction in the manner generally set forth above.

The exact quantity of bisdibutylaminoalkane employed in the insecticide compositions of my invention will be found to vary widely and to a certain extent depend upon the particular bisdibutylaminoalkane concerned, the type of composition in which such an insecticide is being employed, and the nature of the insect pest to be controlled. Generally speaking, however, a concentration of from about 4 to 7 per cent based upon the total weight of the finished insecticidal composition will be found sufficient. Any of the common vehicles employed in insecticide sprays, such as kerosene, "Ultrasene," or other similar petroleum distillates, may be used in preparing the insecticidal compositions of my invention.

The effectiveness of my new contact insecticides was determined in accordance with a modification of the standard Peet Grady test. This procedure for testing insecticidal compositions is described in the 1940 "Blue Book" published by the publisher of "Soap and Sanitary Chemicals" periodical on pages 193 to 197. In actual practice, this type of test consists of releasing from 100 to 150 housefly adults (five day old houseflies were used in these particular tests) in an air-conditioned cage, 6' x 6' x 6', and spraying them with 6 ml. of insecticide. After ten minutes' exposure, the number of flies incapacitated or knocked down is noted and all flies are then transferred to a cage and allowed to recuperate in fresh air for 24 hours at which time the dead flies are counted. In carrying out these tests, the bisdibutylaminoalkanes were mixed with kerosene in concentrations ranging from 4 to 7 per cent as compared with an official test insecticide, (O. T. I.) containing 5 per cent pyrethrum extract in kerosene. The table which follows shows the results obtained by testing these various sprays in the manner generally described above. The relative effectiveness of one of the more efficient commercial contact insecticides was determined and compared with the results obtained using a typical bisdibutylaminoalkane of the present invention. The average per cent kill there shown represents from between ten and one hundred ninety individual tests.

*Table*

| Compound | Concentration, Per Cent | Average Per Cent Kill | Average O. T. I. Per Cent Kill | Average Per Cent Kill with Commercial Product |
|---|---|---|---|---|
| 1,4-bisdibutylaminobutane | 5 | 78.4 | 55.5 | 43.3 |
|  | 6 | 84.2 | 58.9 |  |
|  | 7 | 98.0 | 75.2 |  |
| 1,2-bisdibutylaminobutane | 5 | 79.0 | 58.4 |  |
|  | 6 | 89.3 | 60.3 |  |
|  | 7 | 98.3 | 75.2 |  |

On the basis of the results shown in the above table, it can be seen that bisdibutylaminoalkanes possess marked insecticidal activity. Also, it will be apparent that such compounds in addition to being useful by themselves in insecticide sprays constitute a valuable adjunct to toxicants which have previously been employed for similar purposes. Thus, the bisdibutylaminoalkanes of my invention may be utilized in conjunction with materials, such as pyrethrum, rotenone, derris extract, nicotine, organic thiocyanates, and the like.

The insecticidal compositions of my invention may be applied in a number of different ways. For use as household insecticides, the bisdibutylaminoalkanes may be dissolved in kerosene or similar petroleum distillates with or without the addition of other toxicants and sprayed. For use on plants, the bisdibutylaminoalkanes may be dissolved in various plant spraying oils and emulsified in water to produce sprayable emulsions. Any of the common emulsifying agents utilized for such purposes can be employed in conjunction with these insecticidal compositions. In like manner, the bisdibutylaminoalkanes themselves without the addition of petroleum distillates or similar liquids may be emulsified and used as plant spray insecticides.

Now having described my invention, what I claim is:

1. An insecticidal composition comprising a bisdibutylaminoalkane in which the alkylene groups, both ends of which are singly bonded to a separate nitrogen atom, contain from three to four carbon atoms, and a carrier therefor.

2. An insecticidal composition comprising a bisdibutylaminoalkane, and a carrier therefor.

3. An insecticidal composition adapted for use as a contact insecticide comprising 1,2-bisdibutylaminobutane, and a carrier therefor.

4. An insecticidal composition adapted for use as a contact insecticide comprising 1,4-bisdibutylaminobutane, and a carrier therefor.

5. An insecticidal composition adapted for use as a contact insecticide comprising 1,3-bisdibutylaminopropane, and a carrier therefor.

6. The composition of claim 1 where the carrier is a petroleum distillate.

7. The composition of claim 1 where the carrier is kerosene.

GLEN H. MOREY.

REFERENCES CITED

The following references are of record in the file of this patent:

UNITED STATES PATENTS

| Number | Name | Date |
|---|---|---|
| 2,121,509 | Pyman et al. | June 21, 1938 |
| 2,221,931 | Treboux | Nov. 19, 1940 |
| 2,271,378 | Searle | Jan. 27, 1942 |

OTHER REFERENCES

Beilstein, Band III–IV, 4th edition, page 265.

Certificate of Correction

Patent No. 2,433,525.   December 30, 1947.

GLEN H. MOREY

It is hereby certified that errors appear in the printed specification of the above numbered patent requiring correction as follows: Column 1, lines 44 and 45, 46, 53, and 54, for the word "bisdibutylaminoalkanes" read *bisdibutylaminoalkenes*; column 2, lines 21 and 24, for "bisdibutylaminoalkane" read *bisdibutylaminoalkene*; column 3, in the table, 3rd column, line 4 thereof, for "79 0" read *79.0*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.*